United States Patent [19]
Yamaashi et al.

[11] Patent Number: 5,502,497
[45] Date of Patent: Mar. 26, 1996

[54] TELEVISION BROADCASTING METHOD AND SYSTEM ENABLING PICTURE BROADCASTING FROM THE TRANSMITTING EQUIPMENT TO THE RECEIVING EQUIPMENT USING ALTERNATIVE BROADCASTING SYSTEM STANDARDS

[75] Inventors: Kimiya Yamaashi, Hitachi; Masayuki Tani, Katsuta; Koichiro Tanikoshi, Hitachi; Masayasu Futakawa, Hitachi; Shinya Tanifuji, Hitachi; Atsushi Kawabata, Hitachi; Norito Watanabe, Hitachi; Kazunari Maeda, Tondabayashi, all of Japan

[73] Assignee: Hitachi, Ltd., Tokyo, Japan

[21] Appl. No.: 470,449

[22] Filed: Jun. 6, 1995

Related U.S. Application Data

[63] Continuation of Ser. No. 936,779, Aug. 28, 1992, abandoned.

[30] Foreign Application Priority Data

Aug. 28, 1991 [JP] Japan ................... 3-217508

[51] Int. Cl.$^6$ ..................... H04N 7/08
[52] U.S. Cl. ..................... 348/473; 348/476
[58] Field of Search ..................... 348/473, 474, 348/484, 476, 6, 7, 10; 358/142, 143, 147, 146, 86; H04N 7/08

[56] References Cited

U.S. PATENT DOCUMENTS

| | | | |
|---|---|---|---|
| 4,390,901 | 6/1983 | Keiser | 358/147 |
| 4,807,031 | 2/1989 | Broughton | 348/473 |
| 4,994,913 | 2/1991 | Maeshima | 358/142 |
| 5,014,125 | 5/1991 | Pocock et al. | |
| 5,070,404 | 12/1991 | Bullock | 358/142 |
| 5,151,782 | 9/1992 | Ferraro | 358/86 |
| 5,195,134 | 3/1993 | Inoue | 358/147 |
| 5,200,823 | 4/1993 | Yoneda | 358/146 |
| 5,212,551 | 5/1993 | Conanan | 348/484 |
| 5,229,850 | 7/1993 | Toyoshima | 358/86 |
| 5,231,494 | 7/1993 | Wachob | 358/146 |

FOREIGN PATENT DOCUMENTS 0444947  9/1991  European Pat. Off. .

*Primary Examiner*—James J. Groody
*Assistant Examiner*—Sherrie Hsia
*Attorney, Agent, or Firm*—Antonelli, Terry, Stout & Kraus

[57] ABSTRACT

A television broadcasting system intended to bestow a certain level of selectivity on compression systems and multiplexing systems for broadcast program pictures. A transmitting equipment transmits the broadcast program pictures, and transmits control information on transmission systems for the transmitted broadcast program pictures. A receiving equipment includes a reception module which receives a program channel having a plurality of sorts of video information multiplexed therein, selected by a viewer, and also the control information concerning the selected program channel. A reception controller commands a signal separator to produce the outputs of the video information interleaved in those positions of the program channel which are designated by the control information. Besides, the reception controller sends a decoder a decoding program contained in the control information. The decoder executes the sent decoding program so as to decode the output video information of the signal separator and to display the decoded video information on a display unit.

18 Claims, 13 Drawing Sheets

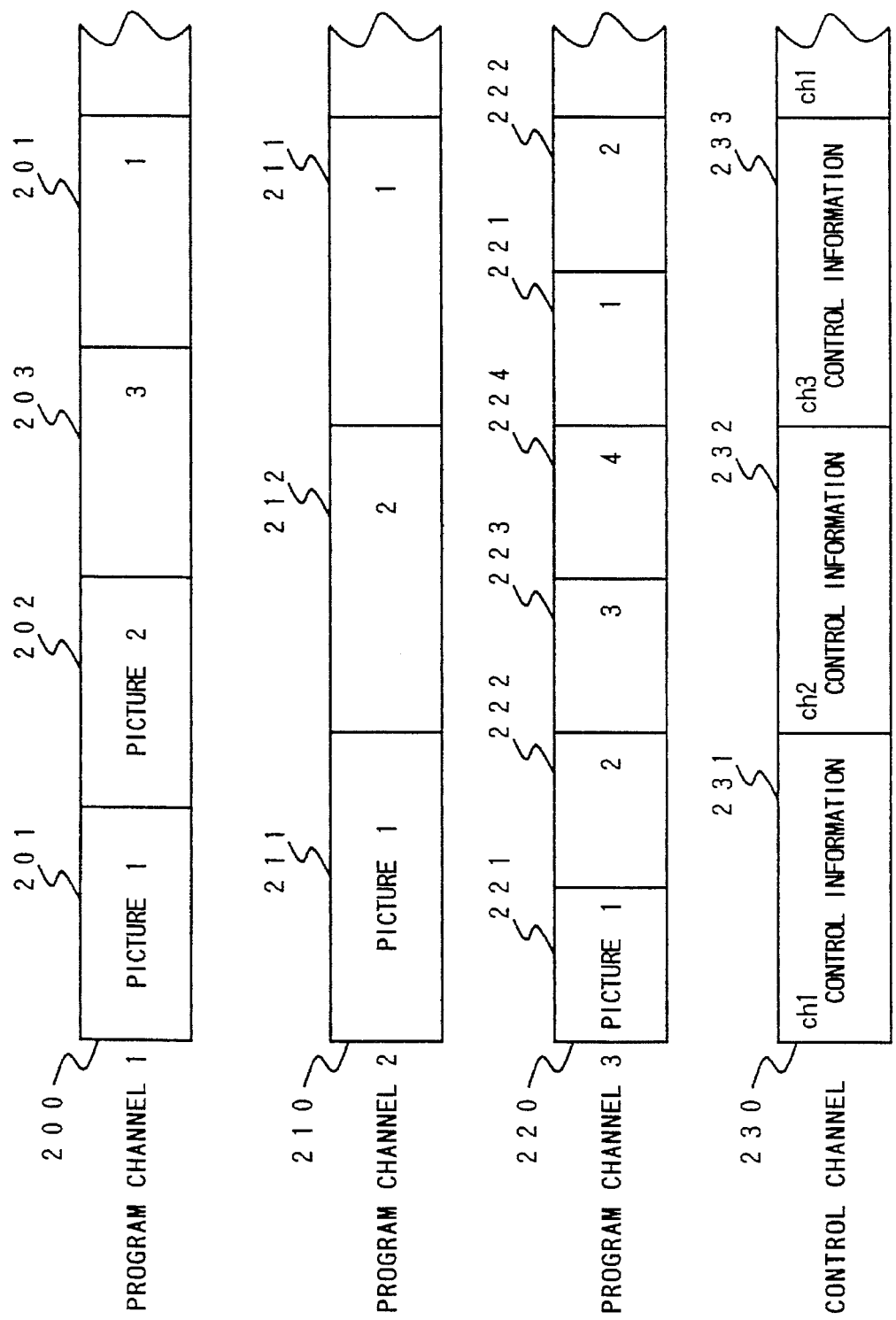

FIG. 3

| ITEMS | | CONTENTS | CONCRETE CONTENTS | |
|---|---|---|---|---|
| PROGRAM ID | 310 | UNIQUE No. OF PROGRAM | NUMERAL OF 32 BITS PECULIAR TO EACH PROGRAM | 321 |
| PICTURE INFORMATION | 320 | PICTURE SIZE | 525" 525 | 322 |
| | | NUMBERS OF PICTURES AND FRAMES | 30 FRAMES/SEC.  3 PICTURES/FRAME | 323 |
| | | PIXEL COMPOSITION | 8 BITS FOR EACH OF R, G AND B COMPONENTS | 324 |
| | | PIXEL ARRAYAL | R G B | 331 |
| COMMUNICATION INFORMATION | 330 | COM. SYSTEM | P C M / F M | 332 |
| | | NUMBER OF BITS | 8 BITS | 333 |
| | | SYNC FRAME SIGNAL | 0×FFFFFFFF | 341 |
| CONTROLLING PROGRAM | 340 | CONTROL PROGRAM | CONTROL PROGRAM | 342 |
| | | PICTURE DECODING PROGRAM | SIMPLE RUN LENGTH | 343 |
| | | INTERACTUAL IMAGE | MENU IMAGE | |

300

TELEVISION BROADCASTING METHOD AND SYSTEM ENABLING PICTURE BROADCASTING FROM THE TRANSMITTING EQUIPMENT TO THE RECEIVING EQUIPMENT USING ALTERNATIVE BROADCASTING SYSTEM STANDARDS

This application is a continuation application of Ser. No. 07/936,779, filed Aug. 28, 1992, now abandoned.

BACKGROUND OF THE INVENTION

The present invention relates to broadcasting communication systems for television broadcasting, radio broadcasting, etc. More particularly, it relates to a broadcasting system which features an arrangement wherein control information items for viewing broadcast contents are also transmitted and received.

Various broadcasting systems are adopted for present-day television broadcasting.

By way of example, the NTSC system is a broadcast system standard generally employed in Japan. In addition to the NTSC system, the PAL system and the SECAM system are employed in many other countries.

Besides, the ISDB (Integrated Services Digital Broadcasting) system has been studied wherein video signals are digitized and then turned into compressed codes, which are subjected to time-division multiplexed transmission.

In general, one receiving set can receive a plurality of broadcasts allotted to different channels as long as the broadcasts are in an identical broadcasting form. Thus, a viewer selects one of the plurality of channels which his/her receiving set can receive, in accordance with desired information, and he/she views the picture of the selected channel.

SUMMARY OF THE INVENTION

The present invention has for its object an attention to provide a television broadcasting system in which compression systems, multiplexing systems, the selections of pictures by viewers, etc. are rendered flexible in order to offer multifarious services to the viewers.

The present invention consists of a television broadcasting system having a transmitting equipment which transmits a broadcast program picture, and a receiving equipment which receives and displays the transmitted broadcast program picture; characterized in that the transmitting equipment transmits control information for specifying a transmission system for the transmitted broadcast program picture, and that said receiving equipment receives the control information on the basis of a predetermined standard and then receives and displays said broadcast program picture transmitted from the transmitting equipment, on the basis of the received control information.

Accordingly, the transmission systems such as encoding systems and multiplexing systems can be flexibly selected depending upon various conditions such as the characteristics of the broadcast program pictures to-be-transmitted, and multifarious services can be offered to the viewers.

BRIEF DESCRIPTION OF THE DRAWINGS

FIG. 2 is an explanatory diagram showing the situation of broadcasting channels for use in the embodiment;

FIG. 3 is an explanatory diagram showing control information for use in the embodiment;

DETAILED DESCRIPTION OF THE PREFERRED EMBODIMENTS

Now, an embodiment of the present invention will be described.

Figure 1:
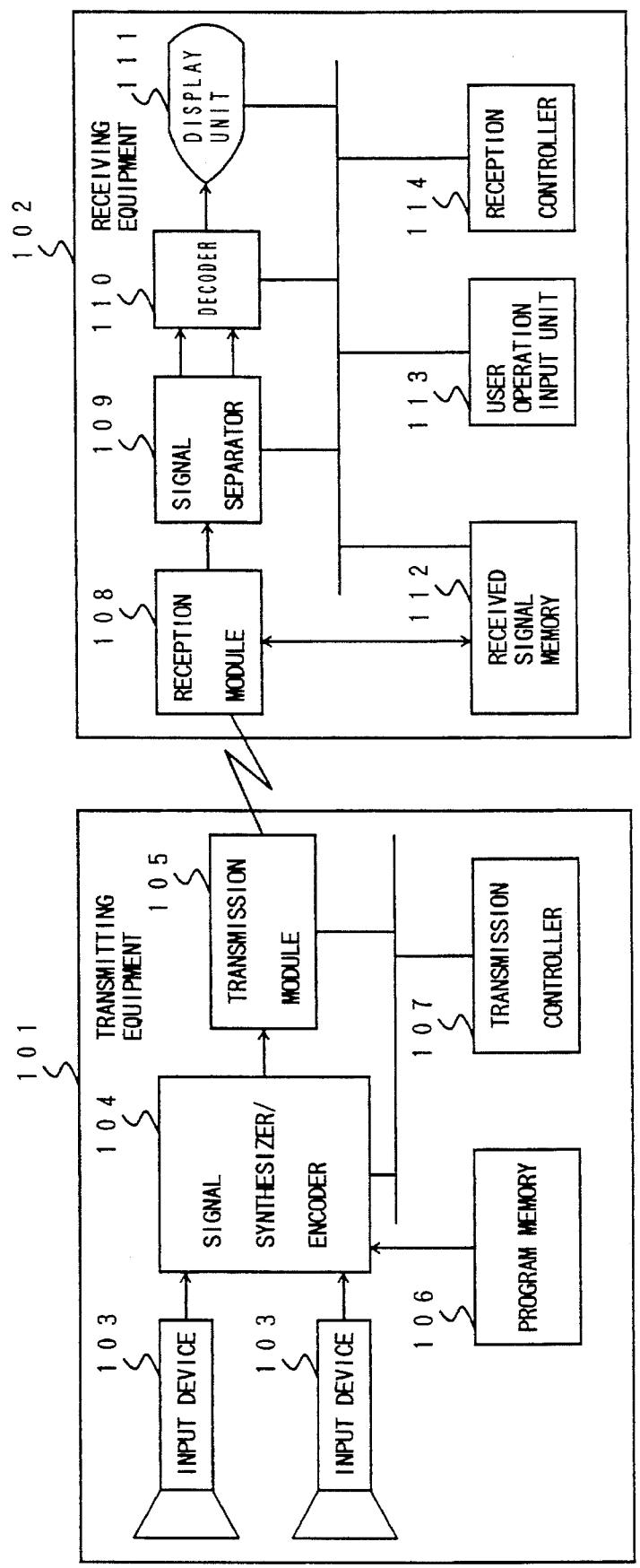
FIG. 1 is a block diagram showing the architecture of a television broadcasting system according to an embodiment of the present invention.

First, the architecture of a television broadcasting system according to this embodiment is illustrated in FIG. 1.

As shown in the figure, the television broadcasting system in this embodiment is configured of a transmitting equipment 101 and a receiving equipment 102.

The transmitting equipment 101 transmits broadcast information, while the receiving equipment 102 accepts broadcast information and displays a broadcast content. The broadcasting of the broadcast information from the transmitting equipment 101 may be either wireless broadcasting or wire broadcasting. In other words, it is not restricted to conventional television broadcasting by wireless, but it may well be broadcasting based on so-called cable television or the like.

The transmitting equipment 101 includes a plurality of input devices 103, a signal synthesizer/encoder 104, a transmission module 105, a program memory 106 and a transmission controller 107.

The receiving equipment 102 includes a reception module 108, a signal separator 109, a decoder 110, a display unit 111, a received signal memory 112, a user operation input unit 113 and a reception controller 114.

The constituents of the transmitting equipment 101 function as stated below.

Each of the input devices 103 accepts into the transmitting equipment 101, broadcast content information to-be-broadcast such as text, a still picture, motion pictures or voice.

Control information items for respective broadcasting channels are kept stored in the program memory 106. As will be described later, the control information serves to control the broadcast content of the corresponding broadcasting channel.

The signal encoder/synthesizer 104 encodes the respective broadcast content information items accepted by the plurality of input devices 103. In addition, it accepts the corresponding control information items stored in the program memory 106 and encodes them. On this occasion, it affixes parity error correction codes to the control programs of the control information items in order to facilitate error corrections on the receiving side.

Subsequently, the signal encoder/synthesizer 104 subjects the encoded broadcast content information items to time-division multiplexing operations for every broadcasting channel and sends the resulting multiplexed signals to the transmission module 105. In addition, it subjects the encoded control information items to time-division multiplexing together with the control information of other broadcasting channels and sends the resulting multiplexed signals to the transmission module 105.

The transmission module 105 modulates the broadcast content information items subjected to the time-division multiplexing for every broadcasting channel by the signal encoder/synthesizer 104, at a frequency specified for every broadcasting channel, and it transmits the resulting modulated signals. In addition, it modulates the control information items subjected to the time-division multiplexing, at a specified frequency, and it transmits the resulting modulated signals.

Further, the transmission controller 107 controls the operations of the other constituents included in the transmitting equipment 101.

Here, the relationships between the motion picture information and the control information which are transmitted from the transmitting equipment 101 are as illustrated in FIG. 2. The example shown in FIG. 2 corresponds to a case where the content broadcast information items are motion pictures.

Referring to the figure, numerals 200, 210 and 220 indicate the broadcasting channels each of which contains the broadcast content information items subjected to the time-division multiplexing. As seen from the figure, the broadcasting channel 200 (program channel #1) contains three motion pictures 201, 202 and 203 subjected to the time-division multiplexing; the broadcasting channel 210 (program channel #2) contains two motion pictures 211 and 212; and the broadcasting channel 220 (program channel #3) contains four motion pictures 221, 222, 223 and 224.

The other broadcasting channel 230 (a control channel) contains control information items 231, 232 and 233 which control the broadcast contents concerning the broadcasting channels 200, 210 and 220, respectively, and which have been subjected to the time-division multiplexing.

In the broadcasting channel 230, the control information items 231, 232 and 233 have been respectively subjected to the time-division multiplexing in a predetermined sequence, and they bear synchronizing flags for specifying the positions of the individual control information signals. Incidentally, the control information is repeatedly broadcast at certain regular intervals as long as it is valid. This is based on the fact that the reception of the program channel is sometimes started midway through a broadcast program.

Hereinbelow, the broadcasting channel which contains the control information items subjected to the time-division multiplexing shall be called the "control channel", while the broadcasting channel which contains the broadcast content information items subjected to the time-division multiplexing shall be called the "program channel".

Next, the functions of the constituents of the receiving equipment 102 will be stated.

The user operation input unit 113 accepts the viewer's instructions for the receiving equipment 102. It is now assumed that any program channel desired to be viewed is selected as the viewer's instruction. Here, the viewer is only allowed to select any of the broadcasting channels except the control channel, that is, any of the program channels.

The reception module 108 receives and demodulates the control channel transmitted from the transmitting equipment 101.

The signal separator 109 separates or demultiplexes the time-division-multiplexed control information items contained in the control channel demodulated by the reception module 108, samples the control information concerning the selected program channel on the basis of the synchronizing flags, and decodes the sampled control information. In the signal separator 109, the parity codes affixed in relation to the control signals are checked, and any errors are corrected.

The reception controller 114 sets the reception module 108, signal separator 109 and decoder 110 in accordance with the decoded control information.

The reception module 108 receives and demodulates the selected program channel in accordance with set contents afforded from the reception controller 114.

The signal separator 109 separates or demultiplexes the broadcast content information items contained in the demodulated program channel, and delivers any of the separated or demultiplexed broadcast content information items to the decoder 110 in accordance with the set contents afforded from the reception controller 114.

The decoder 110 decodes the video signals of the broadcast content information in accordance with the set contents afforded from the reception controller 114. In this embodiment, the decoder 110 is constructed of a DSP (Digital Signal Processor). This decoder 110 runs the set decoding program afforded from the reception controller 114.

The display unit 111 accepts the decoded signals of the broadcast content information from the decoder 110, and displays them.

Next, the contents of the control information used in this embodiment will be explained. The control information is generated for each of the broadcast programs which are televised by the program channel.

FIG. 3 lists the contents of the control information. The illustrated example is the control information concerning the program channel in which all the broadcast content information items subjected to the time-division multiplexing are motion picture data.

As shown in the figure, the control information 300 is formed of a program ID 310, picture or video information 320, communication information 330 and a controlling program 340.

The program ID 310 is a peculiar identification No. which is affixed to every control information for each broadcast program to-be-televised.

The picture or video information 320 serves to notify the reception controller 114 of the picture which is transmitted by the program channel corresponding to the control information 300.

The video information 320 consists of a picture size 321, the numbers of picture and frames 322, a pixel composition 323 and a pixel arrayal 324.

The picture size 321 denotes the numbers of pixels in the height and width of the picture. The numbers of pictures and frames 322 indicate the frame rate of the picture per second, and the number of pictures multiplexed in the corresponding program channel.

The pixel composition 323 indicates the number of bits which express each of the R, G and B components of one pixel. In the example shown in FIG. 3, the number of bits is set to 8 (256 gradations).

The pixel arrayal 324 indicates how the information items of the respective color components are stored in the motion picture data. In the example shown in FIG. 3, the respective color components are stored in single-image units in the order of the image of the component R, that of the component G and that of the component B.

The communication information 330 consists of a communication system 331, the number of bits 332 and a synchronizing frame signal 333.

The communication system 331 serves to notify the reception controller 114 of the communication system of the program channel corresponding to the control information 300. In the illustrated example, this item 331 indicates that the corresponding program channel adopts pulse-code frequency modulation (PCM/FM) as its communication system.

Besides, the number of bits 332 indicates the bit length of the data. In the illustrated example, it is set to 8. The synchronizing frame signal 333 indicates a data value which is used for a synchronizing frame serving as the reference of the positions of the motion picture data signals in the program channel. In the illustrated example, the data value of the synchronizing frame is set at OXFFFFFFFF.

The controlling program 340 is a program which is loaded in the reception controller 114, and which serves to decode the motion picture of the selected program channel and to offer several services.

This controlling program 340 consists of a control program 341, a decoding program 342 and interactual image data 343.

The control program 341 offers several services in relation to the program channel to which the control information 300 corresponds.

The picture decoding program 342 serves to decode the video or picture information which has been encoded and transmitted. In the illustrated example, a run-length decoding program is stored.

The dialog or menu image data 343 is the data of an image which the control program 341 uses in order to offer the services to the viewer.

In this manner, the transmitting equipment 101 enters into the control information 300 the information items which are necessary for reproducing the transmitted broadcast content information and the programs which serve to present the broadcast content information.

The first operating example of the television broadcasting system according to this embodiment will be explained below.

Now, let's consider a program in which a kitchen cookery situation simultaneously photographed by a plurality of cameras is televised.

Figure 4:
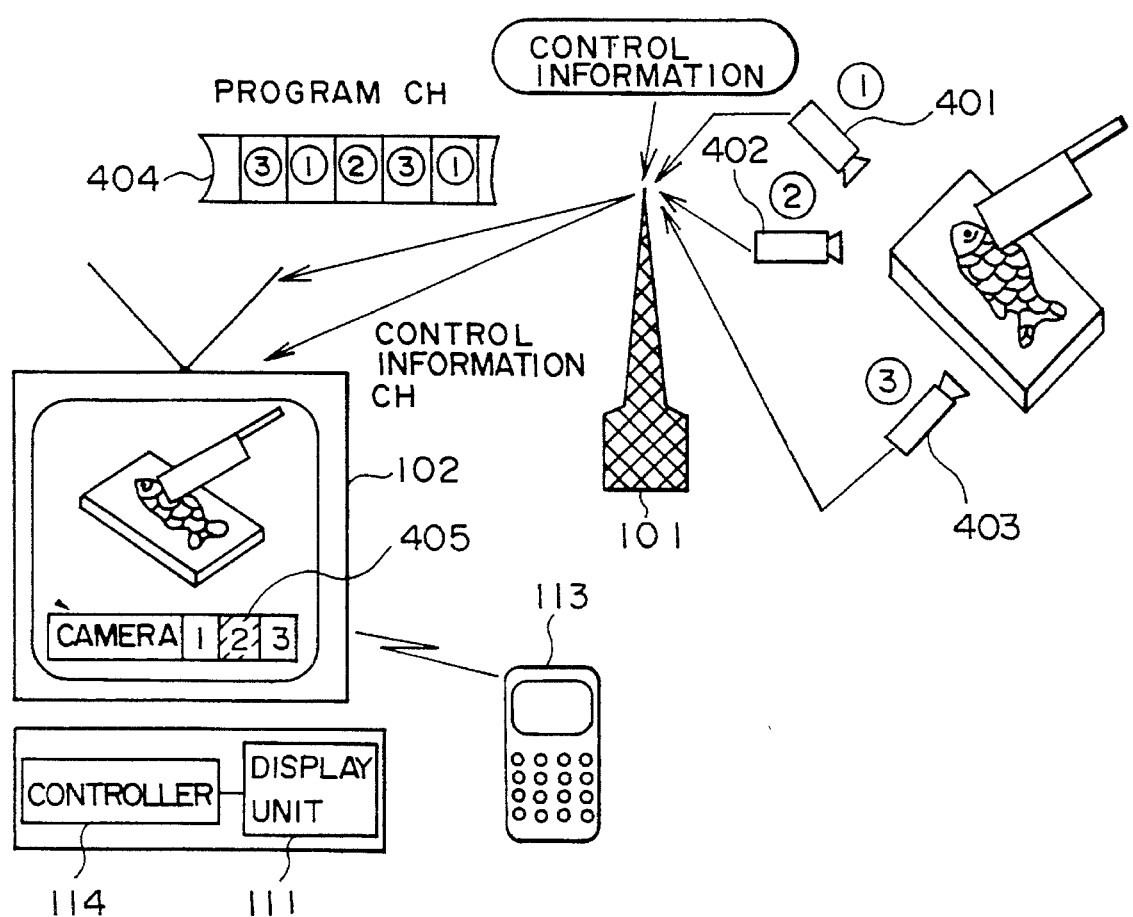
FIG. 4 is an explanatory diagram showing the first operating example of the television broadcasting system of the embodiment.

FIG. 4 illustrates the circumstances of such a program broadcast.

First, operations on the side of the transmitting equipment 101 will be explained.

Referring to FIG. 4, input devices #1, #2 and #3 (401, 402 and 403) installed in the transmitting equipment 101 pick up respectively the image of hands, that of a knife blade and that of the whole situation. A picture taken by the input device #1 shall be called the "picture #1", a picture taken by the input device #2 the "picture #2", and a picture taken by the input device #3 the "picture #3".

In the transmitting equipment 101, the signal synthesizer/encoder 104 operates so that the photographed pictures are digitally sampled, that the sampled data items are turned into compressed codes every frame by the run length method, and that the picture or video data items after the data compression are arrayed in frame unit successively in the order of the picture #1, the picture #2 and the picture #3 and are subjected to time-division multiplexing. Subsequently, the transmission module 105 modulates the multiplexed signals at a frequency allotted to a program channel 404 and transmits the modulated signals over the program channel 404. Incidentally, alternative principal systems for encoding pictures include systems based on the DCT (Discrete Cosine Transform). In this embodiment, the sampled picture data may well be turned into compressed codes by the DCT system. In the case of employing the DCT system for the data compression, the picture decoding program of the control information becomes a program which executes the inverse DCT.

In addition, the control information for controlling the pictures #1, #2 and #3 of the program channel 404 in the receiving equipment 102 is fetched from the program memory 106 into the signal synthesizer/encoder 104 and is subjected to time-division multiplexing with control information items concerning program channels other than the program channel 404. Subsequently, the transmission module 105 modulates the multiplexed control information items and transmits the modulated signals over a control channel.

Here, the control information concerning the program channel 404 contains as the control program 341 a program which allows the viewer to select a picture to-be-displayed from among the pictures taken by the three cameras.

Figure 5:
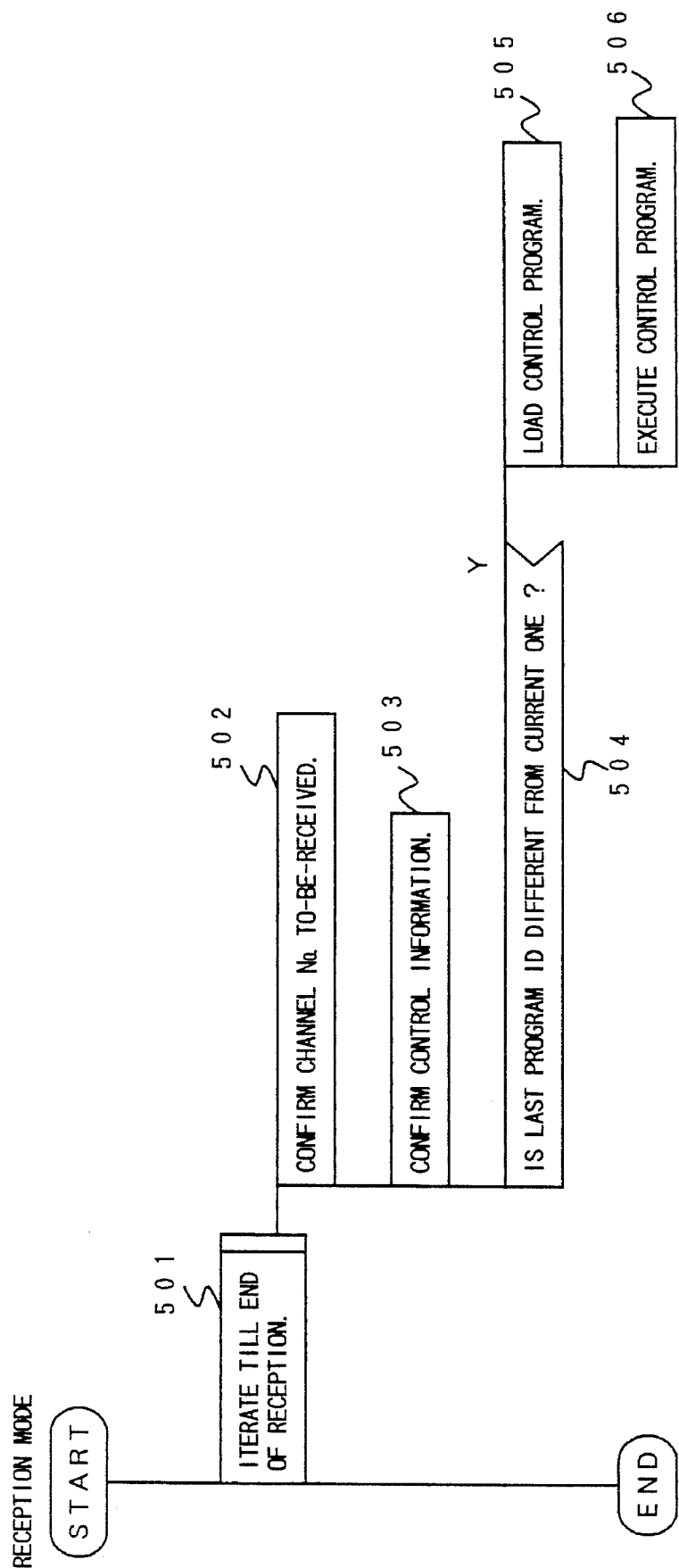
FIG. 5 is a flow chart showing the reception operation of a reception controller in the first operating example.

Next, operations on the side of the receiving equipment 102 which receives the program channel 404 will be explained along flow charts illustrated in FIGS. 5 and 6.

Upon the start of reception, the reception controller 114 first confirms a program channel to-be-received (step 502). It loads the program ID (310 in FIG. 3) in the control information (300) concerning the program channel 404 as decoded by the signal separator or demultiplexor 109 (step 503), and it compares the current program ID with the program ID of the control information loaded the previous time (step 504). On condition that the program ID's are different, the current control information is loaded in the reception controller 114 as new control information (step 505). After having loaded the control information, the reception controller 114 executes the control program (341) contained in the control information (step 506). A step 501 signifies that the above processing is iterated until the end of the reception.

Figure 6:
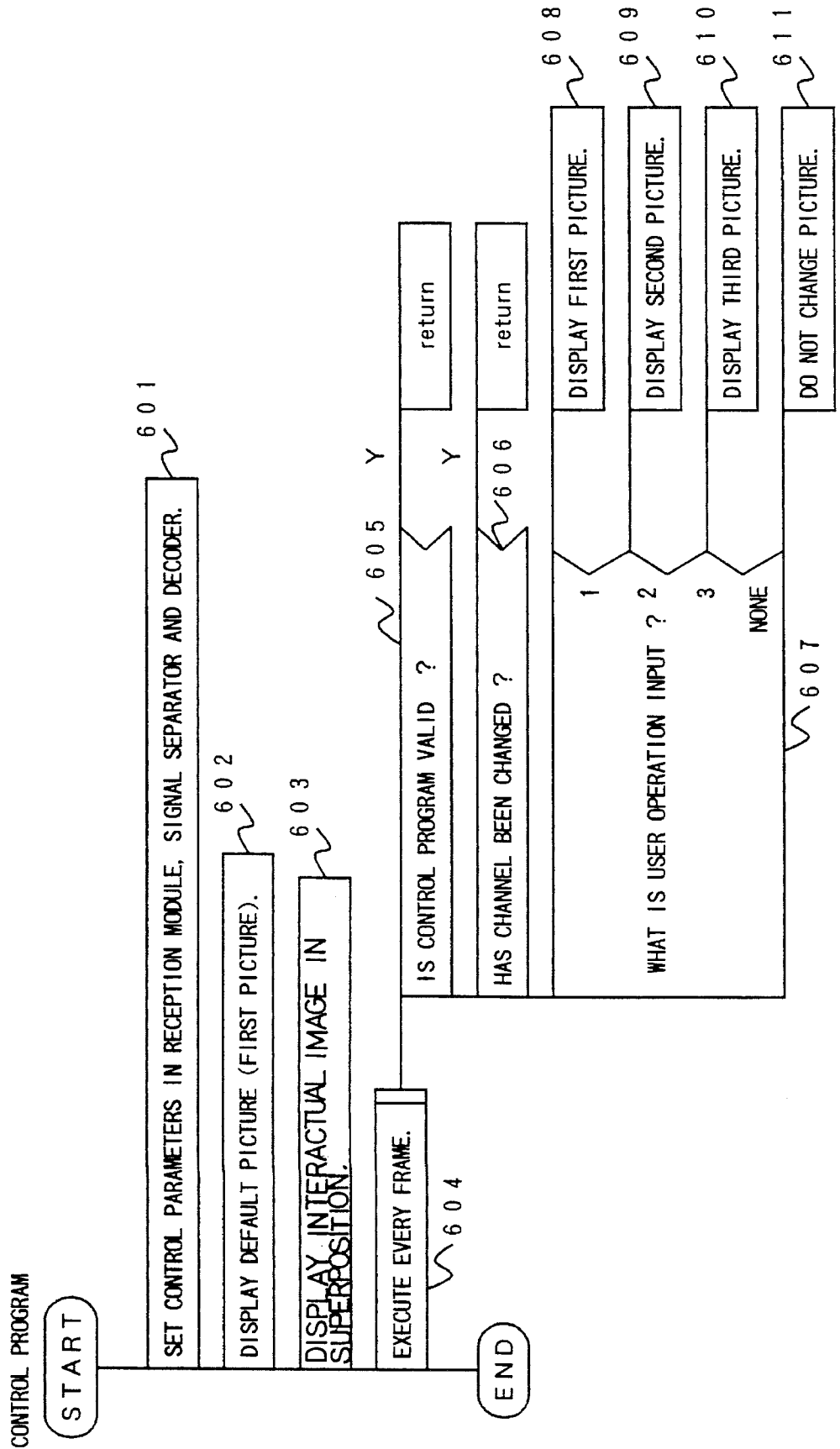
FIG. 6 is a flow chart showing a control program which is run by the reception controller in the first operating example.

The flow chart of the control program (341 in FIG. 3) is illustrated in FIG. 6.

As shown in the figure, the control program proceeds as stated below.

First, the reception controller 114 sets the reception module 108, signal separator 109 and decoder 110 in accordance with the received control information 300 (step 601). Specifically, the communication information 330 contained in the control information 300 is sent to the reception module 108. The reception module 108 demodulates the data items of the program channel 404 in succession on the basis of the sent communication information 330. Then, it sends the demodulated data to the signal separator or demultiplexor 109. Further, the reception controller 114 sends the picture or video information 320 to the signal separator 109. The signal separator 109 separates or demultiplexes the demodulated data of the program channel 404 into the data of the picture #1, that of the picture #2 and that of the picture #3 on the basis of the sent picture information 320 and delivers any of the separated picture data items to the decoder 110 in accordance with the command of the reception controller 114. It is now assumed that, at the start of the reception, the data of the picture 441 is delivered to the decoder 110 as a default picture (step 602). Hereinbelow, the picture based on the data of the picture 441 shall be called the "image #1", the picture based on the data of the picture #2 the "image #2", and the picture based on the data of the picture #3 the "image #3". Still further, the reception controller 114 sends the picture decoding program 342 to the decoder 110. The decoder 110 executes the sent program 342, thereby decoding the picture or video data accepted from the signal separator 109 and displaying the decoded data on the display unit 111.

At the next step, those image data items of the interactual image data 343 which are designated in the control program 341 are displayed in superposition on the image displayed on the display unit 111 (step 603). As a result, a user selection menu as shown at numeral 405 in FIG. 4 is displayed at the lower stage of the screen of the display unit 111. The user selection menu 405 allows the user or viewer to select the picture which is to be displayed on the display unit 111.

Subsequently, the ensuing processing is iterated for every picture frame (step 604).

In a case where the viewer has given an instruction in conformity with the user selection menu 405 (step 607), the reception controller 114 commands the signal separator or demultiplexor 109 to change-over the output thereof to the instructed picture data. Then, the output picture data is decoded by the decoder 110 and is displayed on the display unit 111. That is, the viewer can select and view any desired picture from among the image of the hands, that of the knife blade and that of the whole cooking scene of the broadcast program (steps 608~611).

In addition, the reception controller 114 checks for every picture frame, if the program ID of the control information to be received has changed and if the program channel has been changed by the user (steps 605, 606). On condition that the program ID of the control information to be received has changed or that the program channel has been changed, the control program is ended and is returned to the first processing step of accepting the control information.

As thus far described, according to this embodiment, the multiplexing degree of the broadcast content information items in each program channel, the encoding rules of the broadcast content information items, etc. can be designated for the receiving equipment by the control information, so that the transmitting side can broadcast in aspects which conform to services to-be-offered. In particular, many sorts of encoding rules can be utilized in such a way that the program for decoding the encoded broadcast content information is transmitted to the receiving equipment by the control information.

Further, the program which controls the displays of the broadcast content information items in each program channel in compliance with the request of the viewer or user can be sent to the receiving side by the control information, so that the viewer can flexibly utilize the broadcast content information as he/she requests.

That is, according to the broadcasting system of this embodiment, the broadcasting can be realized in the presence of only a standard concerning the control information and without the necessity of a unique standard for the program channels.

Incidentally, in the foregoing, the control information concerning the selected program channel in the receiving equipment 102 has been described as being valid for the broadcast content information which is received from commencement of the reception of the control information until the subsequent reception of the different control information. However, video broadcast content information to be controlled by control information may well be specified so as to validate the control information for only the specified broadcast content information. This control aspect can be realized in the following way: The transmitting equipment 101 transmits the control information in which information on the broadcast content information to be controlled by the pertinent control information has been entered beforehand. On the other hand, the receiving equipment 102 temporarily stores the received control information. It validates the stored control information when the broadcast content information to be controlled by the pertinent control information has been received, whereas it invalidates the validated control information when the reception of the broadcast content information to be controlled by the pertinent control information has ended.

Besides, in the foregoing, the broadcasting frequencies of the program channels have been described as being fixed, but they may well be made variable. In this case, the broadcasting equipment 101 transmits control information in which information for designating the broadcasting frequency of the corresponding program channel has been entered beforehand. The reception controller 114 of the receiving equipment 102 commands the reception module 108 to receive the broadcasting frequency, on the basis of the broadcasting frequency information contained in the control information corresponding to the selected program channel.

In addition, although the control channel and the program channels have been described above as being separately provided, control information items may well be transmitted in the state in which they are multiplexed with broadcast content information items in any predetermined program channel. In this case, however, positions for multiplexing the control information items and the broadcasting frequency of the program channel bearing the multiplexed control information items are fixed. The reason therefor is that the receiving equipment 102 is permitted to uniquely receive the control information corresponding to the selected program channel in accordance with the viewer's selection of the program channel.

Yet in addition, in this embodiment, the decoder 110 is constructed using a DSP, and the decoding programs are set, thereby making it possible to decode the broadcast content information items conforming to any desired encoding rules. However, in a case where the sorts of encoding systems for use in broadcasts are limited, dedicated encoding means may well be provided for the respective encoding systems for use in the broadcasts so as to decode the content information items of the broadcasts. In this case, the transmitting equipment 101 enters information for designating the encoding system, into the control information instead of the picture decoding program. Then, the reception controller 114 of the receiving equipment 102 validates only the decoding means corresponding to the designated encoding system in accordance with the encoding system-designating information.

Now, the second operating example of the broadcasting system according to this embodiment will be described.

In this operating example, broadcast content information items are temporarily stored and are thereafter utilized.

The broadcast content information items are recorded as stated below.

When a program channel to be recorded is set by the viewer, the reception controller 114 commands the received signal memory or recorder 112 to record control information on the set program channel and the data of the program channel in parallel. However, in a case where the received signal recorder 112 cannot store signals in parallel, the control information and the data of the program channel are multiplexed and then recorded, and the recorded signals are demultiplexed and restored into two parallel signals in a playback mode. In a case where the control information has changed in the recording operation, new control information after the change is also recorded. Incidentally, it is assumed that each broadcast content information item in the program channel bears the header of a program name for every program, and that a peculiar title is affixed as a header to every group or set of information items within each program. A video tape deck, a rewritable type optical disk memory, or the like can be employed for the received signal recorder or memory 112.

Figure 7:
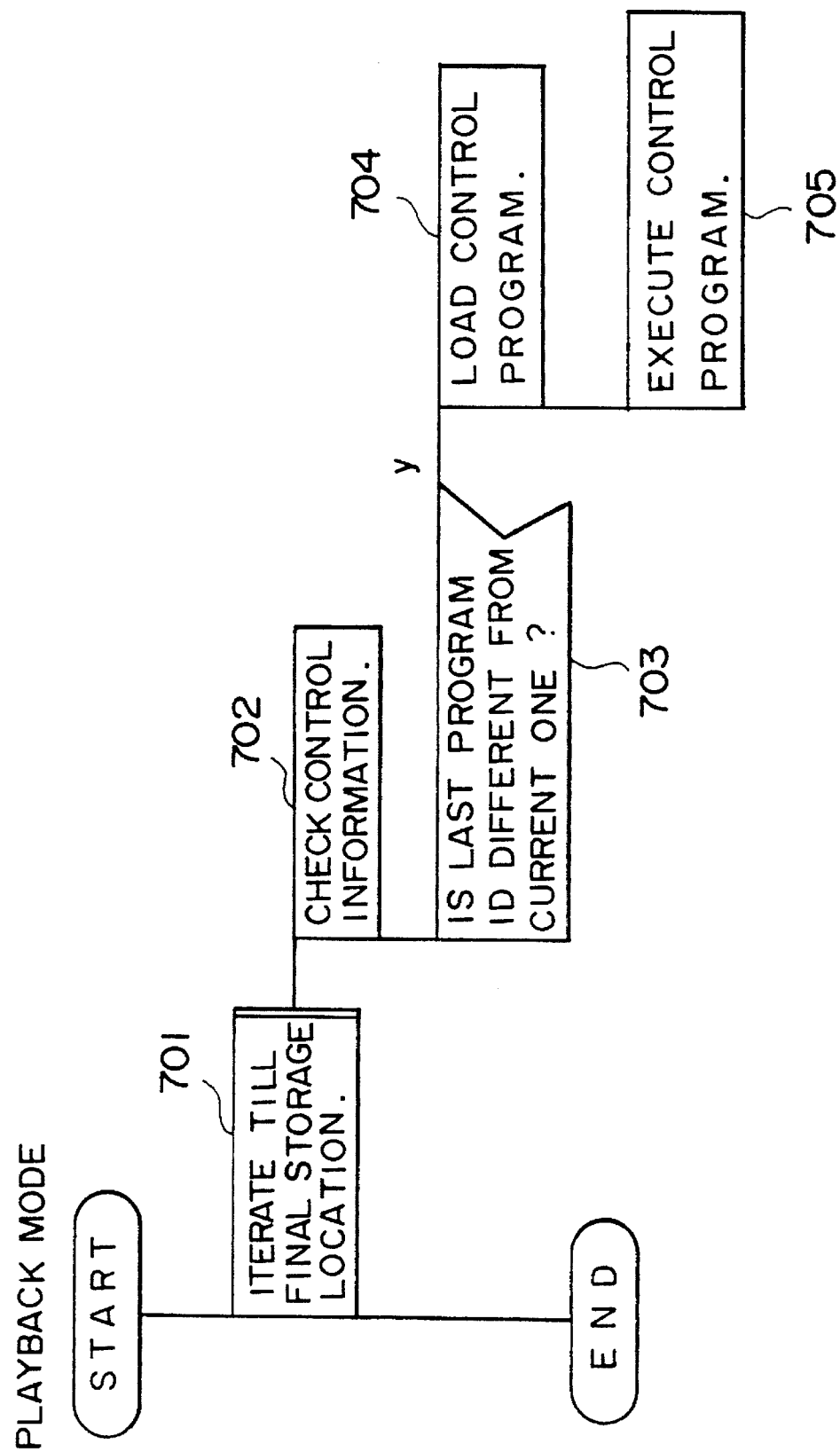
FIG. 7 is a flow chart showing the playback operation of a reception controller in the second operating example.

The operation of playing back the broadcast content information recorded in the received signal recorder 112 will be explained along a flow chart shown in FIG. 7.

When the instruction of playback has been afforded from the user operation input unit 113, the reception controller 114 checks the control information items stored in the received signal recorder 112, successively in the order in which they have been recorded (step 702). Upon detecting the control information 300, the reception controller 114 compares the last program ID 310 of the pertinent control information with the current program ID thereof (step 703). On condition that both the ID's are different, the reception controller 114 loads the control program 341 from within the control information 300 (step 704), and it executes the control program 341 (step 705). A step 701 signifies that the above steps are iterated until the final storage location is reached.

Figure 8:
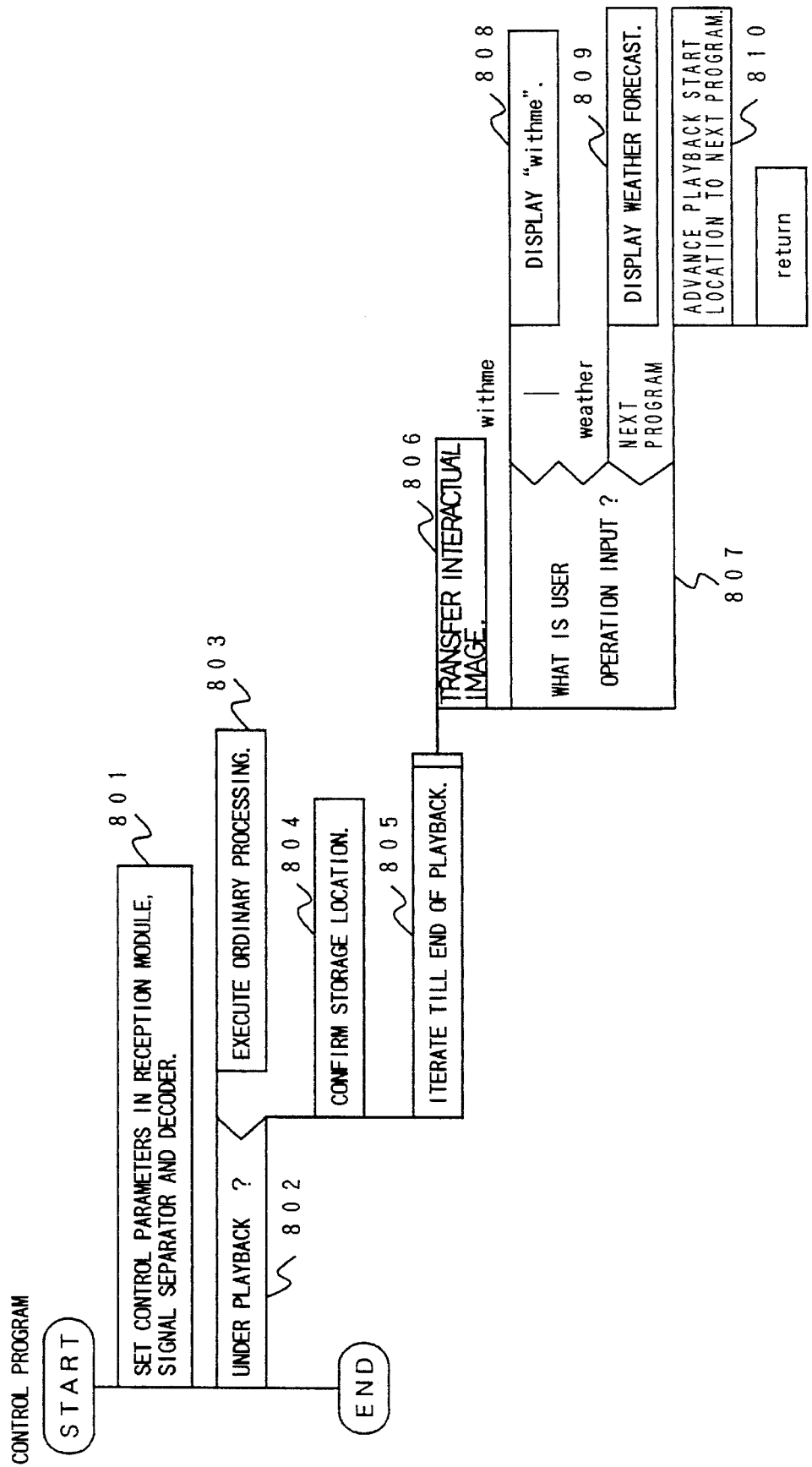
FIG. 8 is a flow chart showing a control program which is run by the reception controller in the second operating example.

The flow chart of the control program 341 for use in this operating example is illustrated in FIG. 8.

As shown in the figure, the reception controller 114 having started the run of the control program 341 first sets the contained communication information 330 of the control information 300 in the reception module 108, the picture or video information 320 in the signal separator or demultiplexor 109 and the picture decoding program 342 the decoder 110 (step 801).

Subsequently, the reception controller 114 checks if the playback from the received signal memory 112 is currently instructed (step 802).

When the playback is not instructed, the ordinary processing (refer to FIG. 6) explained as the first operating example is performed. On the other hand, when the playback is instructed, the relationship of the respective broadcast content information items within the program corresponding to the control information, with the storage locations in the received signal recorder 112 are confirmed on the basis of the headers of the broadcast content information items for every title affixed to this broadcast content information (step 804).

The ensuing processing is performed until the end of the playback (step 805).

Figure 10:
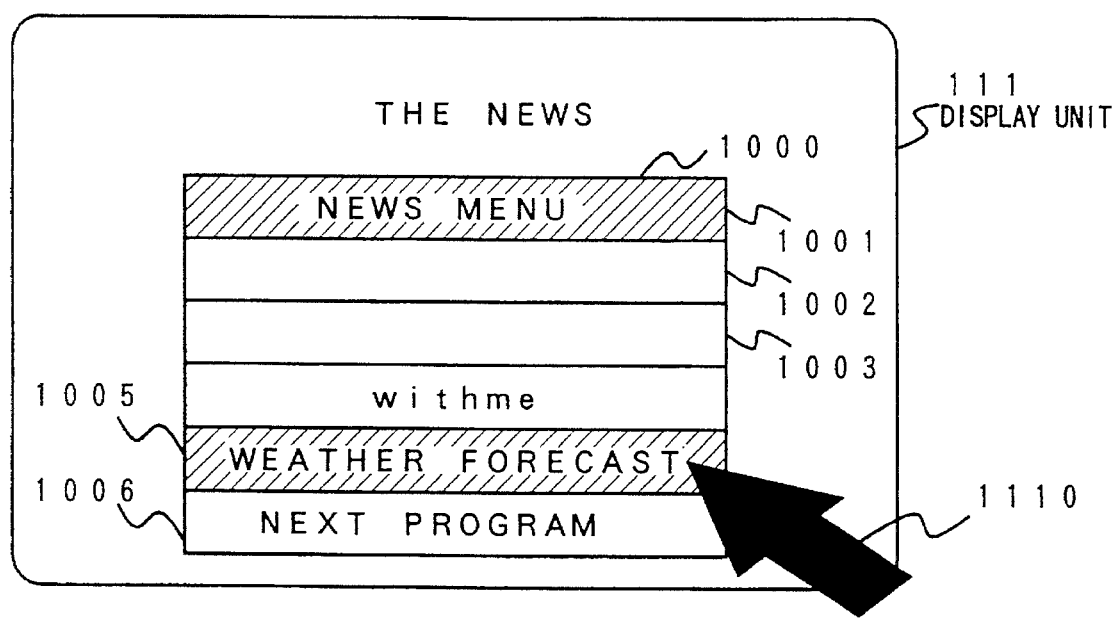
FIG. 10 is an explanatory diagram showing a menu which is displayed on a display unit in the second operating example.

More specifically, as illustrated in FIG. 10, a program name 1001 and a playback menu 1000 which correspond to the control information are displayed on the display unit 111 (step 806). The items of the menu 1000 are the titles 1002~1004 of the respective information items contained in the program, and the next program 1006. The example shown in FIG. 10 is in the case of playing back the program "News" which contains the information having the title "With me" and the information having the title "Weather forecast". The titles 1002~1004 of the respective information items within the program correspond to the titles affixed to the broadcast content information items.

Subsequently, when the viewer has designated the title of desired information among the playback menu 1000 through the user operation input unit 113 (step 807), the broadcast content information bearing the corresponding title as the header is played back in compliance with the designation (step 808 or 809).

In a case where the next program 1006 has been designated, the start position of playback is advanced to the end location of the broadcast content information bearing the name of the current program as the header (step 810), and the control program is run from the foregoing process for checking the control signals.

Figure 9:
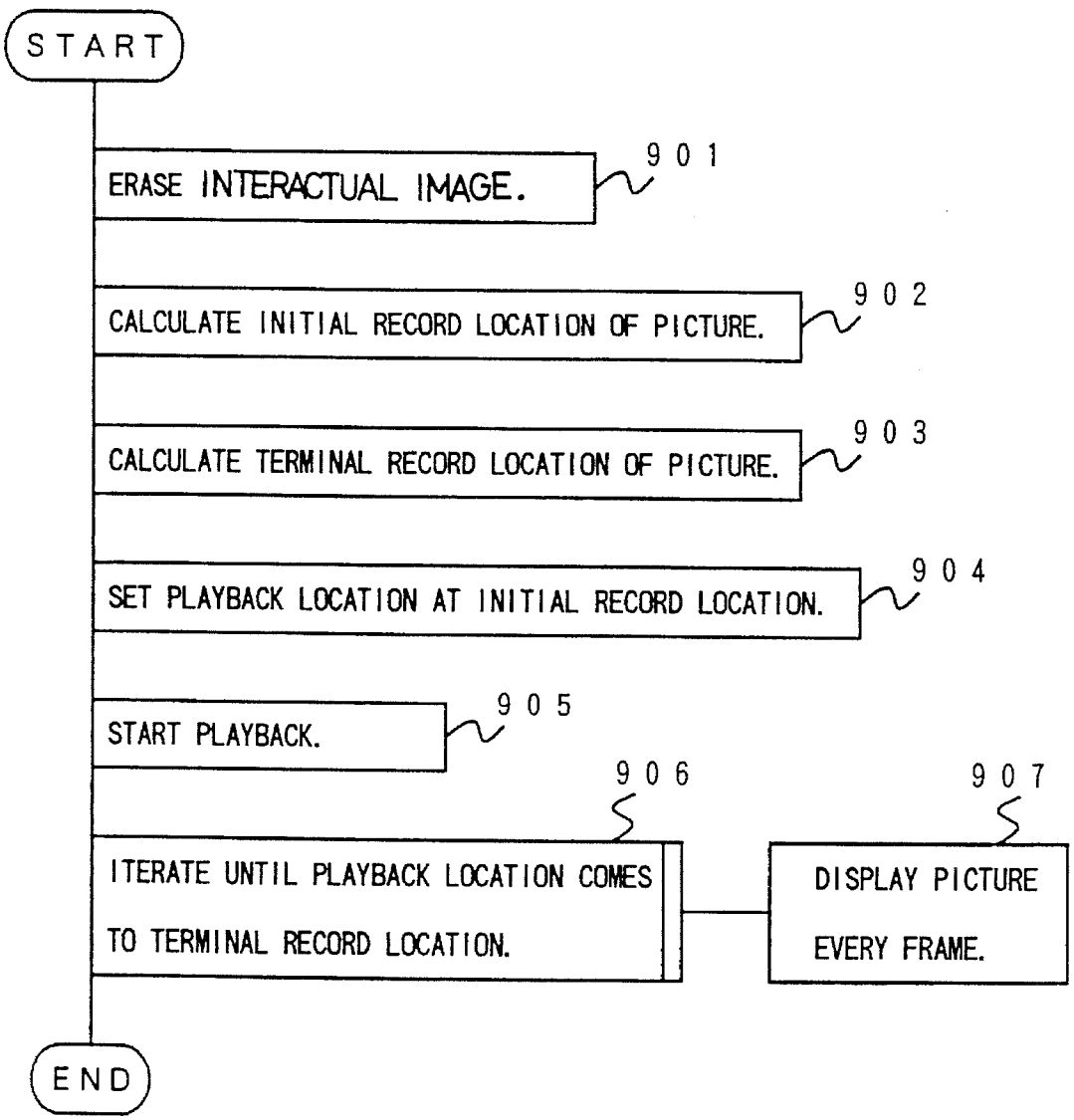
FIG. 9 is a flow chart showing the picture display operation of the reception controller in the second operating example.

Meanwhile, the broadcast content information to which the title designated by the viewer is affixed as the header is played back in accordance with a flow chart illustrated in FIG. 9.

First, the reception controller 114 erases the display of the menu image shown in FIG. 10 (step 901). Subsequently, it calculates the initial or foremost storage location and the terminal or last storage location of the broadcast content information which bears the designated title as the header (steps 902, 903).

The broadcast content information in a section from the calculated initial location to the calculated terminal location is played back (steps 904, 905, 906, 907). The broadcast content information played back is decoded by the decoder 110, and is displayed on the display unit 111. Herein, the decoder 110 decodes the broadcast content information which has been played back on the basis of the picture decoding program 342 set by the reception controller 114.

As thus far described, according to this embodiment, only the required information part in the stored programs can be played back.

In the above embodiment, there is also considered a case where the playback menu 1000 contains a plurality of multiplexed programs. In this case, the received signal memory 112 can simultaneously record all the programs which are being broadcast at the same time. Therefore, such a case can be coped with without hindrance.

Now, the third operating example according to this embodiment will be described.

Figure 11:
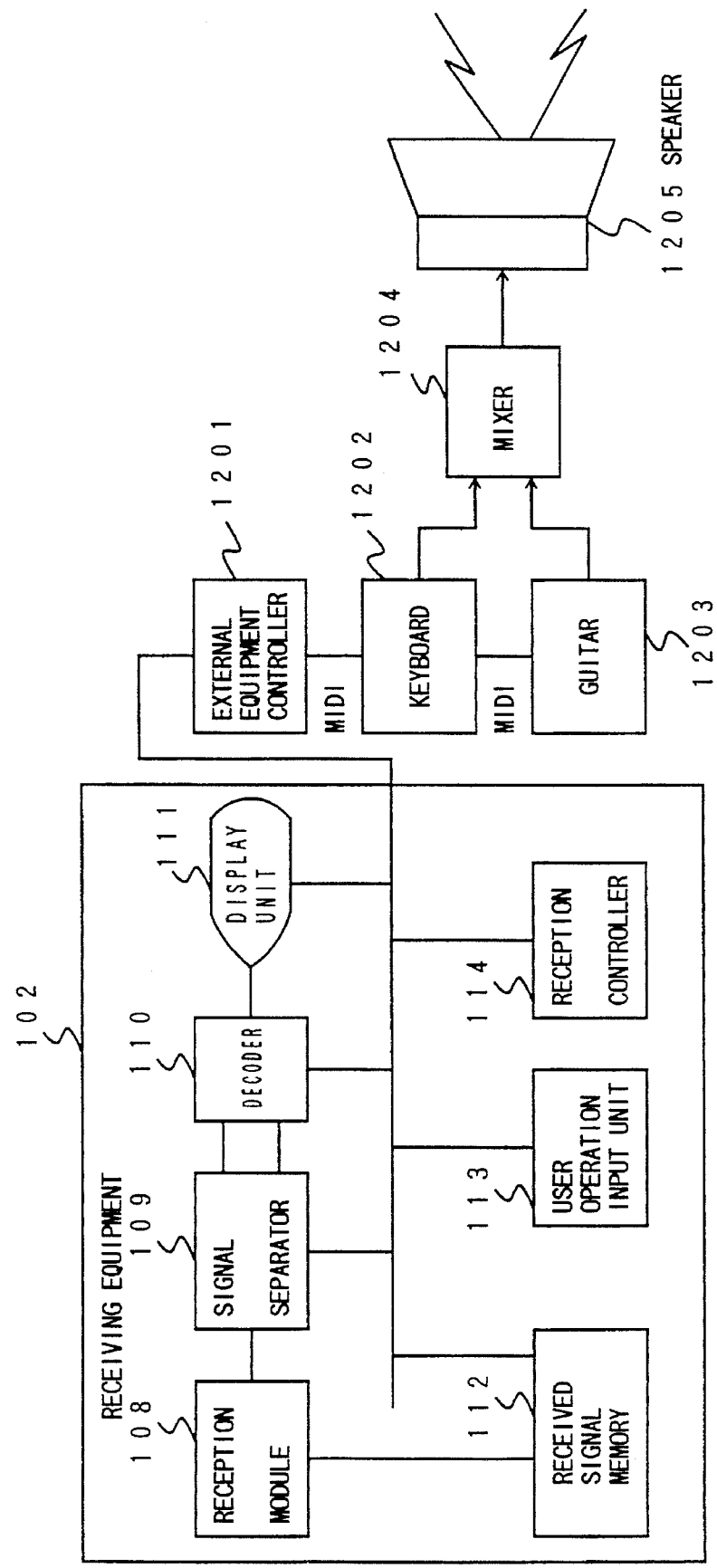
FIG. 11 is a block diagram showing the construction of a receiving side system in the third operating example.

In the third operating example, as illustrated in FIG. 11, at least one external equipment is connected to the receiving equipment 102 and is controlled.

Referring to FIG. 11, numeral 1201 indicates an external equipment controller, numeral 1202 an electronic keyboard, numeral 1203 an electronic guitar, numeral 1204 a mixer, and numeral 1205 a loudspeaker.

Each of the electronic keyboard 1202 and the guitar 1203 is an electronic musical instrument which can be controlled through a MIDI (Musical Instrument Digital Interface).

In this operating example, the transmitting equipment 101 separately encodes the sounds of the respective musical instruments being performed, subjects the respective sound codes to time-division multiplexing as broadcast content information items, and transmits the multiplexed information items over a program channel. In addition, control information corresponding to a pertinent program is endowed with a decoding program which decodes the encoded sound of the musical instrument, and MIDI data which is control information for the external musical instrument connected to the receiving equipment 102. The MIDI data is generated for every part contained in the performance, and is entered into the control information. Besides, a program which accepts the designation of the external musical instrument to be controlled by the MIDI data is entered into the control program 341 contained in the control information 300. The control information is transmitted so that the receiving equipment 102 can utilize the MIDI data in real time in synchronism with the performance transmitted over the program channel. In addition, the broadcast content information is transmitted in the state in which synchronizing data for the synchronization with the MIDI data is affixed thereto.

On the other hand, when the receiving equipment 102 having selected the pertinent program receives the control information, the reception controller 114 starts the control program 341 and sets the decoding program in the decoder 110. The decoder 110 decodes the received sound in accordance with the decoding program, so as to synthesize and produce the sounds of the respective musical instruments.

Figure 12A:
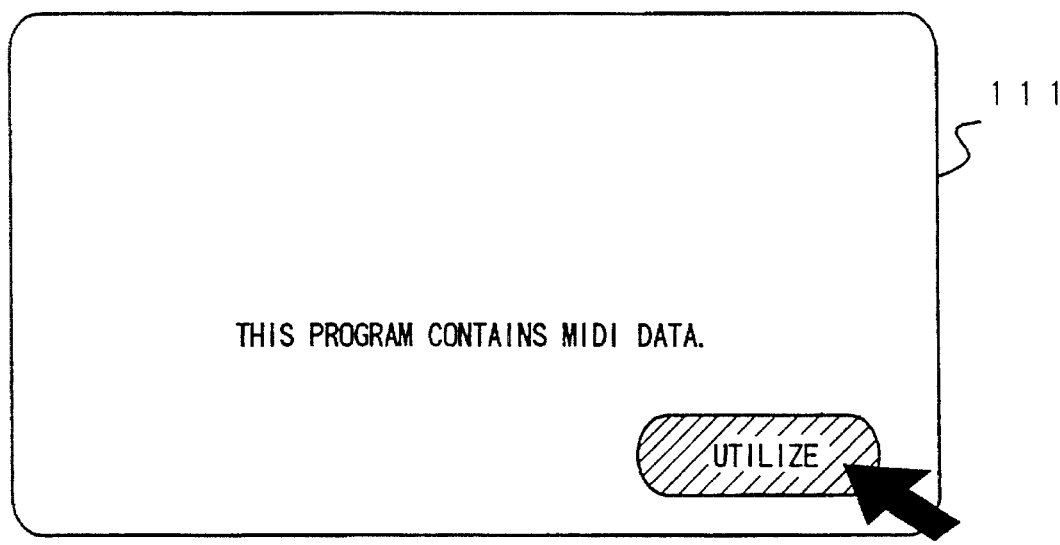
FIGS. 12A and 12B are diagrams for explaining a menu which is displayed on a display unit in the third operating example.

Further, the reception controller 114 commands the display unit 111 to present an image shown in FIG. 12A. Thus, it indicates that the MIDI data can be utilized in the pertinent program, and it accepts a request to commence utilization of the MIDI data.

Figure 12B:
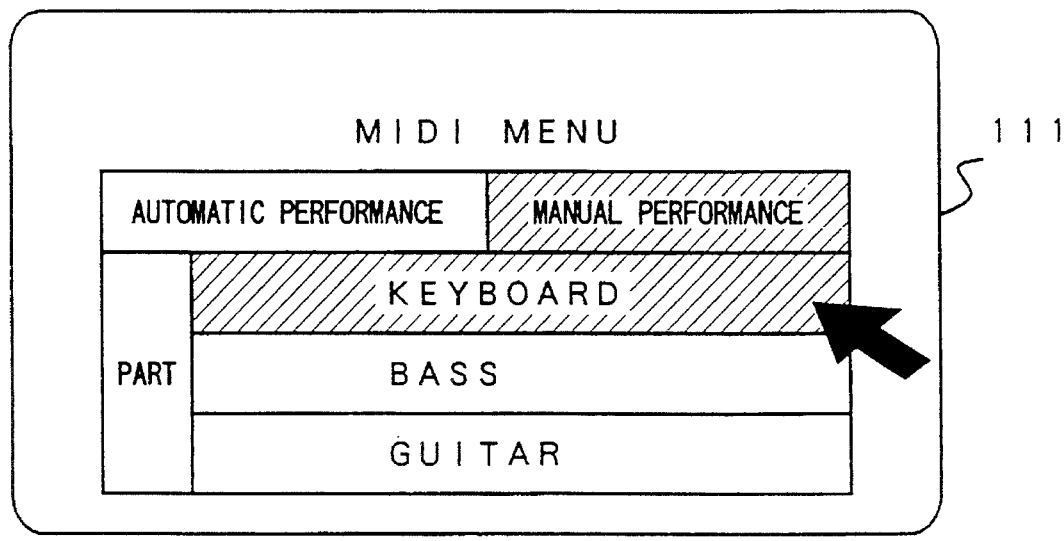

If the utilization of the MIDI data is designated, the reception controller 114 presents a menu shown in FIG. 12B. Thus, it accepts the designation of either an automatic performance or a manual performance and also accepts the for which it is part desired to utilize the MIDI data.

When the automatic performance is designated and the desired part to utilize the MIDI data is designated, the reception controller 114 commands the decoder 110 to produce no sound for the designated part. Then, the MIDI data of the designated part is output to the external equipment controller 1201 in order that the pertinent part may be performed in synchronism with the output sound of the connected electronic musical instrument, on the basis of the synchronizing data affixed to the broadcast content information.

The external equipment controller 1201 sends the received data onto a MIDI bus, and controls the musical instruments so as to produce the sound of the designated part.

On the other hand, when the user designates the manual performance mode in which he/she plays the musical instrument, the reception controller 114 commands the decoder 110 to produce no sound for the designated part, and it ends its processing.

As thus far described, according to this operating example, the user can play his/her electronic musical instrument in time to the transmitted performance.

Incidentally, this embodiment is not restricted to the broadcasting form, but it is quite similarly applicable to picture communications in one-to-one correspondence, such as video telephony.

Besides, in this embodiment, the individual broadcasting channels have been described as being physical channels of different broadcasting frequencies. The system of this embodiment, however, is also applicable to a case where the individual broadcasting channels are logical channels. More specifically, in such a case where all the program channels and the control channel are multiplexed into a single physical channel by, e.g., time-division multiplexing, the following measure may be taken: The position of the control channel and the positions of individual control information items contained in the control channel are fixed. The position of a selected one of the program channels, and broadcast content information contained in the program channel are specified by the control information for the selected channel.

Figure 13:
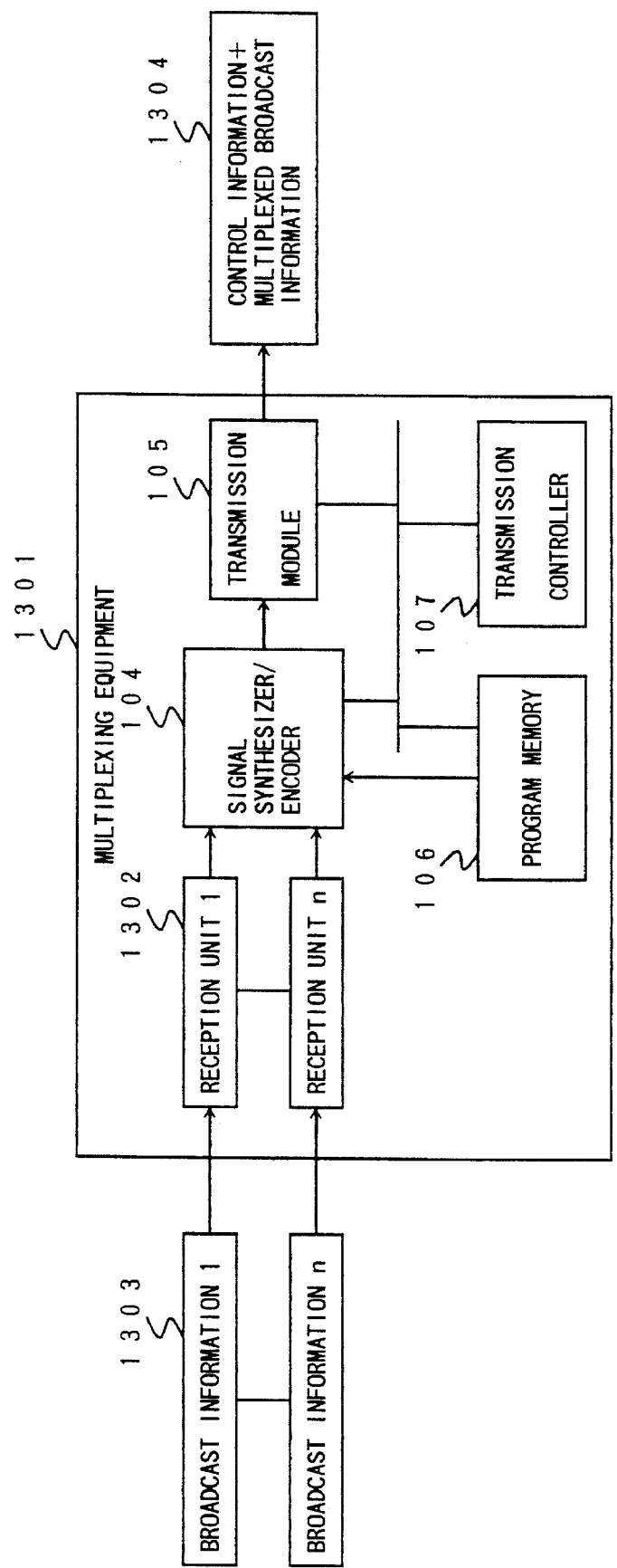
FIG. 13 is a block diagram showing the construction of a transmitting side system in the fourth embodiment of the present invention.

Now, the fourth operating example concerning this embodiment will be described. This operating example consists of a multiplexing equipment in which a plurality of broadcast information items are multiplexed into a single item of broadcast information by the use of the transmitting equipment 101 in the first embodiment. FIG. 13 exemplifies the multiplexing equipment 1301 in the fourth embodiment. Referring to the figure, a signal synthesizer/encoder 104, a transmission module 105, a program memory 106 and a transmission controller 107 are the same as in the transmitting equipment 101 of the first embodiment. In the case of the multiplexing equipment 1301, unlike the case of the transmitting equipment 101, pictures are not directly input to the signal synthesizer/encoder 104, but broadcast information items 1303 are respectively turned by reception units 1302 into pictures, which are input to the signal synthesizer/encoder 104. Thereafter, the signals are synthesized and have control information affixed thereto by the signal synthesizer/encoder 104, and the resulting information 1304 into which the plurality of information items have been multiplexed is output from the transmission module 105. Thus, the plurality of broadcasts can be accepted and multiplexed. Moreover, in the case where the recording in the second embodiment is carried out, a number of programs desired by the user can all be recorded even when they are broadcast in different channels at the same time, by way of example.

Furthermore, the installation of the multiplexing equipment 1301 on a video recorder makes it possible to multiplex the plurality of broadcast information items into the single broadcast information and to store the multiplexed broadcast information in a record medium. In a playback mode, required information in the recorded broadcast information can be played back by executing the decoding operation in the foregoing embodiment. In this way, the plurality of broadcast information items can be recorded on the single record medium in this embodiment in contrast to the recording aspect in which only one broadcast information (or program) can be recorded on one record medium.

As set forth above, the present invention can provide a television broadcasting system in which compression systems, multiplexing systems, the selection of pictures by viewers, etc. are rendered flexible in order to offer multifarious services to the viewers.

What is claimed is:

1. A television broadcasting method wherein a transmitting equipment broadcasts a broadcast program picture, while a receiving equipment receives and displays a broadcasted broadcast program picture from said transmitting equipment, said method comprising the steps of:

broadcasting control information by means of said transmitting equipment, said control information including broadcast system standard information specifying a broadcast system standard for receiving and displaying said broadcast program picture at said receiving equipment;

broadcasting said broadcast program picture in accordance with said broadcast system standard by means of said transmitting equipment;

receiving said control information by means of said receiving equipment; and displaying said broadcast program picture broadcasted from said transmitting equipment, on a basis of said broadcast system standard specified by said broadcast system standard information included in a received said control information by means of said receiving equipment.

2. A television broadcasting method as defined in claim 1, wherein said transmitting equipment encodes said broadcast program picture and then broadcasts said broadcast program picture as an encoded broadcast program picture, and includes a decoding program for decoding said encoded broadcast program picture into said broadcast system standard information included in said control information which is broadcasted, and wherein said receiving equipment decodes said encoded broadcast program picture by executing said decoding program in said broadcast system standard information included in said received control information and then displays a decoded broadcast program picture.

3. A television broadcasting method as defined in claim 1, wherein said transmitting equipment multiplexes a plurality of broadcast program pictures in accordance with a multiplex system and then broadcasts multiplexed broadcast program pictures, and includes multiplex information specifying said multiplex system in said broadcast system standard information for use in separating each of said broadcast program pictures at said receiving equipment, and wherein said receiving equipment selects a subject broadcast program picture which is to-be-displayed, separates said subject broadcast program picture from said multiplexed broadcast program pictures on a basis of said multiplex system specified by said multiplex information in said broadcast system standard information included in received said control information and displays said subject broadcast program picture which has been separated.

4. A television broadcasting method as defined in claim 1, wherein said transmitting equipment multiplexes a plurality of broadcast program pictures and then broadcasts multiplexed broadcast program pictures, and includes in said control information content information items, each of which indicates a respective content of said broadcast program pictures, and wherein said receiving equipment displays said each respective content of said broadcast program pictures multiplexed and broadcasted as indicated by said content information items included in a received said control information, accepts a user selection of a subject broadcast program picture to-be-displayed, separates said subject broadcast program picture in accordance with an accepted said user selection, and displays said subject broadcast program picture which has been separated.

5. A television broadcasting method wherein a transmitting equipment transmits a broadcast program picture, and a receiving equipment receives and displays a transmitted said broadcast program picture from said transmitting equipment, said method comprising the steps of:

transmitting a control program by means of said transmitting equipment, said control program, upon execution at said receiving equipment, allowing for acceptance of user instructions from a user and controlling receiving and displaying of said broadcast program picture at said receiving equipment in accordance with said user instructions in order to support customized use of said broadcast program picture by said user of said receiving equipment; and receiving and executing said control program at said receiving equipment, and thereby supporting customized use of said broadcast program picture by means of said receiving equipment.

6. A television broadcasting system comprising a transmitting equipment which broadcasts a broadcast program picture, and at least one receiving equipment which receives and displays a broadcasted broadcast program picture from said transmitting equipment;

wherein said transmitting equipment comprising a control information transmission means to broadcast control information in accordance with a predetermined format, said broadcast control information including a broadcast system standard information specifying a broadcast system standard for receiving and displaying said broadcast program picture at said receiving equipment, and broadcast program picture transmission means for broadcasting said broadcast program picture in accordance with said broadcast system standard; and wherein said receiving equipment comprising control information reception means to receive said broadcast control information in accordance with said predetermined manner, and broadcast program picture processing means to receive and display said broadcast program picture broadcasted from said transmitting equipment, in accordance with said broadcast system standard specified by said broadcast system standard information included in a received said broadcast control information.

7. A television broadcasting system as defined in claim 6, wherein said broadcast program picture processing means of said receiving equipment includes a memory means to store therein a received said broadcast program picture and a received said broadcast control information, and further comprises a playback means to play back said broadcast program picture stored in said memory means, in accordance with a user instruction, and display means to display a played-back said broadcast program picture in accordance with a stored said broadcast control information.

8. A television broadcasting system as defined in claim 6, wherein said broadcast program picture transmission means of said transmitting equipment encodes said broadcast program picture and then broadcasts an encoded said broadcast program picture, and said control information transmission means of said transmitting equipment includes a decoding program for decoding an encoded said broadcast program picture in said broadcast control information which is broadcasted, and wherein said broadcast program picture processing means of said receiving equipment includes a decoder which decodes a received said broadcast program picture by executing said program included in a received said broadcast control information, and a display unit which displays said broadcast program picture decoded by said decoder.

9. A television broadcasting system as defined in claim 7, wherein said broadcast program picture transmission means of said transmitting equipment multiplexes a plurality of broadcast program pictures using a multiplex system and then broadcasts multiplexed said broadcast program pictures, and said control information transmission means of said transmitting equipment includes multiplex information specifying said multiplex system in said broadcast system standard information included in said broadcast control information which is broadcasted for use in separating each broadcast program picture of said broadcast program pictures at said receiving equipment;

and wherein said broadcast program picture processing means of said receiving equipment includes a separator which selects a subject broadcast program picture to-be-displayed and separates said subject broadcast program picture from said multiplexed broadcast program pictures on a basis of said multiplex system as specified by said multiplex information in said broadcast system standard information included in said received broadcast control information, and a display unit which displays said subject broadcast program picture separated by said separator.

10. A television broadcasting system as defined in claim 9, wherein said transmitting equipment includes a plurality of reception units which receive a plurality of broadcast information items, respectively, and a received said broadcast information items are multiplexed into multiplexed said broadcast program pictures which are to be transmitted by said transmitting equipment.

11. A television transmission equipment comprising an input means for inputting a plurality of broadcast program picture items, a processing means for converting a plurality of input said broadcast program picture items into a signal for broadcast in accordance with a predetermined broadcast system standard, and transmission means for broadcasting said signal and control information specifying said predetermined broadcast system standard.

12. A television transmission equipment as defined in claim 11, wherein said input means inputs a plurality of broadcast program picture items, said processing means multiplexes said plurality of input said broadcast program picture item in accordance with a multiplex system, and said transmission means broadcasts a multiplexed said broadcast program picture items and multiplex control information specifying said multiplex system.

13. A television reception equipment comprising a reception means for receiving a broadcast program picture and control information which are broadcasted in accordance with a predetermined format, said control information specifying a broadcast system standard, and a broadcast content processing means for controlling and displaying said broadcast program picture in accordance with said broadcast system standard specified by said control information received by said reception means.

14. A television reception equipment as defined in claim 13, wherein said broadcast program picture to be received by said reception means is an encoded said broadcast program picture, and said control information to be received by said reception means includes decoding information for specifying a decoding system for an encoded said broadcast program picture, and wherein said broadcast content processing means includes a control means for specifying a decoding system for said broadcast program picture in accordance with said control information received by said reception means, a decoder means for decoding said broadcast program picture in accordance with said decoding system specified by said control means, and display means for displaying said broadcast program picture decoded by said decoder means.

15. A television reception equipment as defined in claim 13, wherein said reception means receives a plurality of broadcast program pictures multiplexed in a time division manner, and said control information includes a multiplex information item for specifying a time-division multiplexing system of said time-division multiplexed broadcast program pictures, and wherein said broadcast content processing means includes a control means for specifying said time-division multiplexing system in accordance with said multiplex information item included in said control information received by said reception means, a separation means for selecting a subject broadcast program picture to-be-displayed and separating said subject broadcast program picture in accordance with said time-division multiplexing system specified by said control means, and display means for displaying a subject broadcast program picture separated by said separation means.

16. A television reception equipment as defined in claim 15, wherein said control information further includes content information items indicating contents of said broadcast program pictures multiplexed and broadcasted, and wherein said television reception equipment further comprises a control means and a display means, and said control means operates to display said contents of said plurality of broadcast program pictures indicated by said content information items on said display means on a basis of a received said control information, operates to accept selection of a subject broadcast program picture to-be-displayed, and operates to display a selected said subject broadcast program picture on said display means.

17. A television reception equipment comprising a first reception means for receiving control information including frequency broadcast system standard data indicating each frequency channel of a plurality of broadcast program pictures which are subjected to frequency multiplexing and broadcasted, a second reception means for receiving at least one of frequency-multiplexed and broadcasted said plurality of broadcast program pictures in accordance with said control information and frequency broadcast system standard data received by said first reception means, and a display means for displaying a subject broadcast program picture received by said second reception means.

18. A television broadcasting method as claimed in claim 1, wherein said transmitting equipment encodes said broadcast program picture in accordance with a coding system and then broadcasts an encoded said broadcast program picture, and includes coding information specifying said coding system of said encoded said broadcast program picture into said broadcast system standard information included in said control information which is broadcasted, and wherein said receiving equipment decodes a received said broadcast program picture, on a basis of said coding system specified by said coding information in said broadcast system standard information included in said received said control information and then displays a decoded said broadcast program picture.

* * * * *